(12) United States Patent
Tremblay et al.

(10) Patent No.: US 11,376,518 B2
(45) Date of Patent: Jul. 5, 2022

(54) CINEMA LIGHT EMITTING SCREEN AND SOUND SYSTEM

(71) Applicant: IMAX THEATRES INTERNATIONAL LIMITED, Dublin (IE)

(72) Inventors: Denis Tremblay, Brampton (CA); Steven Charles Read, Mississauga (CA); Barry David Silverstein, Rochester, NY (US); Andrew F. Kurtz, Macedon, NY (US); Jesse Donald McMullen-Crummey, Toronto (CA); Antanas Matthew Broga, Cambridge (CA)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 17/024,168

(22) Filed: Sep. 17, 2020

(65) Prior Publication Data
US 2021/0001242 A1 Jan. 7, 2021

Related U.S. Application Data

(63) Continuation of application No. 16/339,184, filed as application No. PCT/IB2017/056186 on Oct. 6, 2017, now Pat. No. 10,807,016.

(Continued)

(51) Int. Cl.
*A63J 25/00* (2009.01)
*G02B 5/02* (2006.01)
(Continued)

(52) U.S. Cl.
CPC ............ *A63J 25/00* (2013.01); *G02B 5/0278* (2013.01); *G03B 21/565* (2013.01); *G06F 3/147* (2013.01);
(Continued)

(58) Field of Classification Search
CPC ............ G06F 3/147; G09G 2320/0626; H04R 1/403; H04R 2499/15; H04R 3/12
(Continued)

(56) References Cited

U.S. PATENT DOCUMENTS 1,945,710 A 2/1934 Smoot
2,448,560 A * 9/1948 Walker .................. G03B 21/60
427/163.3

(Continued)

FOREIGN PATENT DOCUMENTS

CN 1512820 7/2004
CN 101069454 11/2007
(Continued)

OTHER PUBLICATIONS

U.S. Appl. No. 16/339,184, Notice of Allowance, dated Jun. 22, 2020, 9 pages.
(Continued)

*Primary Examiner* — William C. Dowling
(74) *Attorney, Agent, or Firm* — Kilpatrick Townsend & Stockton LLP

(57) ABSTRACT

Light emitting displays can be used in cinemas for cinema presentations that integrate a sound system to achieve immersive conditions in cinema theatres. The cinema screen can include a matrix of light emitters and a diffuser sheet. The matrix of light emitters is configured to form a light-emitting area of the cinema screen. The diffuser sheet includes one or more perforations, and can be positioned between the matrix of light emitters and an audience area in the theatre. The diffuser sheet is positioned with respect to the matrix of light emitters such that the one or more perforations are configured to prevent light outputted by the light emitters from being viewable in the audience area.

21 Claims, 14 Drawing Sheets

Related U.S. Application Data

(60) Provisional application No. 62/404,925, filed on Oct. 6, 2016.

(51) Int. Cl.

| | | |
|---|---|---|
| *G06F 3/147* | (2006.01) | |
| *G09G 3/22* | (2006.01) | |
| *H04R 25/00* | (2006.01) | |
| *H04R 1/34* | (2006.01) | |
| *H04R 1/40* | (2006.01) | |
| *H04R 3/12* | (2006.01) | |
| *G09F 9/33* | (2006.01) | |
| *G09F 27/00* | (2006.01) | |
| *G03B 21/56* | (2006.01) | |
| *G09F 9/302* | (2006.01) | |
| *H04R 1/02* | (2006.01) | |

(52) U.S. Cl.
CPC .............. *G09F 9/3026* (2013.01); *G09F 9/33* (2013.01); *G09F 27/00* (2013.01); *G09G 3/22* (2013.01); *H04R 1/025* (2013.01); *H04R 1/028* (2013.01); *H04R 1/345* (2013.01); *H04R 1/403* (2013.01); *H04R 3/12* (2013.01); *G09G 2320/0626* (2013.01); *G09G 2360/141* (2013.01); *G09G 2360/144* (2013.01); *H04R 2499/15* (2013.01)

(58) Field of Classification Search
USPC .................................................... 352/40, 41
See application file for complete search history.

(56) References Cited

U.S. PATENT DOCUMENTS

| | | | | |
|---|---|---|---|---|
| 2,974,566 | A | * | 3/1961 | Hurley .............. B29C 65/4815 359/445 |
| 5,366,761 | A | * | 11/1994 | Chin .................. C01G 49/0036 148/105 |
| 6,999,665 | B2 | | 2/2006 | Veligdan |
| 7,862,206 | B2 | | 1/2011 | Chen et al. |
| 8,049,747 | B2 | | 11/2011 | Arneson et al. |
| 8,300,304 | B2 | | 10/2012 | Gally et al. |
| 8,542,270 | B2 | | 9/2013 | Nelson |
| 8,944,609 | B2 | | 2/2015 | Fox et al. |
| 9,030,386 | B2 | | 5/2015 | Park |
| 9,069,121 | B2 | | 6/2015 | Ligorano et al. |
| 9,558,720 | B2 | | 1/2017 | Jepsen et al. |
| 10,638,218 | B2 | | 4/2020 | Slack |
| 10,807,016 | B2 | | 10/2020 | Tremblay et al. |
| 2006/0153391 | A1 | * | 7/2006 | Hooley .................. H04S 7/301 381/17 |
| 2006/0170614 | A1 | | 8/2006 | Tzong et al. |
| 2006/0262273 | A1 | | 11/2006 | Read et al. |
| 2007/0035706 | A1 | | 2/2007 | Margulis |
| 2008/0118178 | A1 | | 5/2008 | Way et al. |
| 2010/0053450 | A1 | | 3/2010 | Hanamura et al. |
| 2013/0093646 | A1 | | 4/2013 | Curtis et al. |
| 2013/0335716 | A1 | * | 12/2013 | Shields .............. G02F 1/16757 353/99 |
| 2014/0071026 | A1 | | 3/2014 | Hatashita et al. |
| 2014/0168786 | A1 | | 6/2014 | Lee |
| 2014/0177062 | A1 | | 6/2014 | Lee et al. |
| 2014/0233747 | A1 | | 8/2014 | Fox |
| 2014/0235362 | A1 | | 8/2014 | Fox et al. |
| 2015/0208151 | A1 | | 7/2015 | Fox |
| 2016/0086582 | A1 | | 3/2016 | Hu |
| 2016/0163018 | A1 | | 6/2016 | Wang et al. |
| 2016/0366379 | A1 | | 12/2016 | Hickl |
| 2017/0116895 | A1 | | 4/2017 | Declerck |
| 2018/0006011 | A1 | | 1/2018 | Ninan et al. |
| 2019/0043940 | A1 | | 2/2019 | Lee et al. |
| 2020/0160829 | A1 | | 5/2020 | Iversen et al. |
| 2020/0193943 | A1 | | 6/2020 | Iversen et al. |
| 2021/0134212 | A1 | | 5/2021 | Kim |

FOREIGN PATENT DOCUMENTS

| | | |
|---|---|---|
| CN | 101273660 | 9/2008 |
| CN | 202548524 | 11/2012 |
| CN | 104067150 | 9/2014 |
| CN | 105243978 | 1/2016 |
| CN | 105247150 | 1/2016 |
| EP | 1435755 | 7/2004 |
| EP | 1883920 | 2/2008 |
| EP | 3111639 | 1/2017 |
| EP | 3155606 | 4/2017 |
| JP | 06214508 | 8/1994 |
| JP | 06327090 | 11/1994 |
| JP | 2001133888 | 5/2001 |
| JP | 2003177465 | 6/2003 |
| JP | 2005117267 | 4/2005 |
| JP | 2005269402 | 9/2005 |
| JP | 2008542994 | 11/2008 |
| JP | 2009528086 | 8/2009 |
| JP | 2012204979 | 10/2012 |
| KR | 19910009794 | 11/1991 |
| KR | 20070086826 | 8/2007 |
| KR | 20110032180 | 3/2011 |
| WO | 2007087376 | 8/2007 |
| WO | 2008093721 | 8/2008 |
| WO | 2011135283 | 11/2011 |
| WO | 2016115040 | 7/2016 |

OTHER PUBLICATIONS

Application No. PCT/IB2017/056186, International Search Report and Written Opinion, dated Mar. 23, 2018, 19 pages.
PCT/IB2017/056186, "Invitation to Pay Add'l Fees and Partial Search Report", dated Jan. 31, 2018, 7 pages.
CN. Application No. CN201780069111.X, Office Action, dated Jan. 4, 2021, 12 pages.
IN. IN201917015144, "First Examination Report", dated Jun. 6, 2021, 7 pages.
KR Application No. KR10-2019-7012992, Office Action, dated Jun. 22, 2021, 7 pages.
CN Application No. CN201780069111.X, Office Action, dated Sep. 2, 2021, 12 pages.
EP Application No. EP17797437.5, Office Action, dated Oct. 12, 2021, 10 pages.
Japanese Patent Application No. 2019-518212, Office Action dated Oct. 19, 2021, 9 pages (English machine translation provided).

* cited by examiner

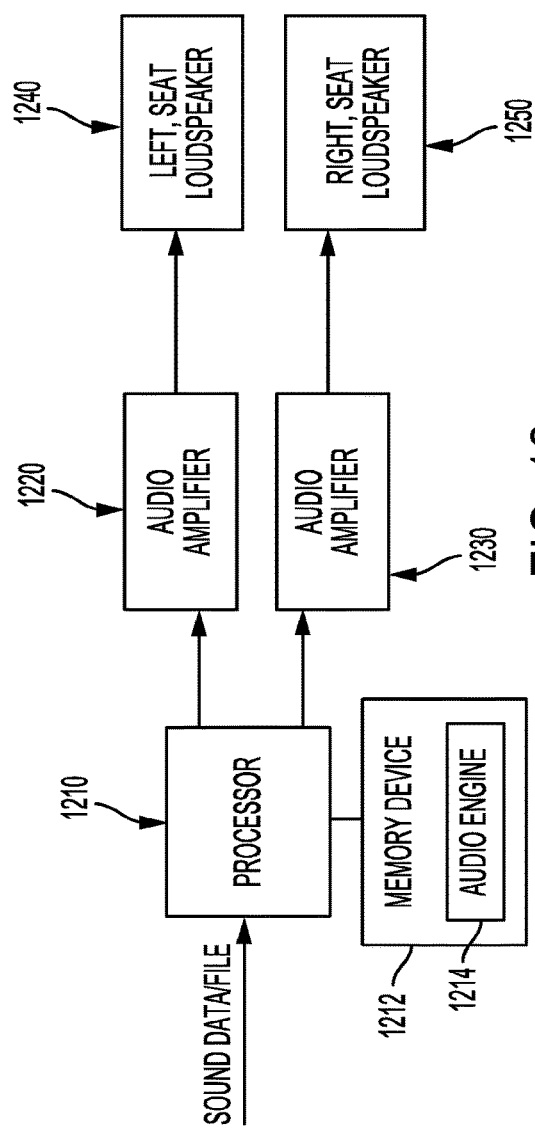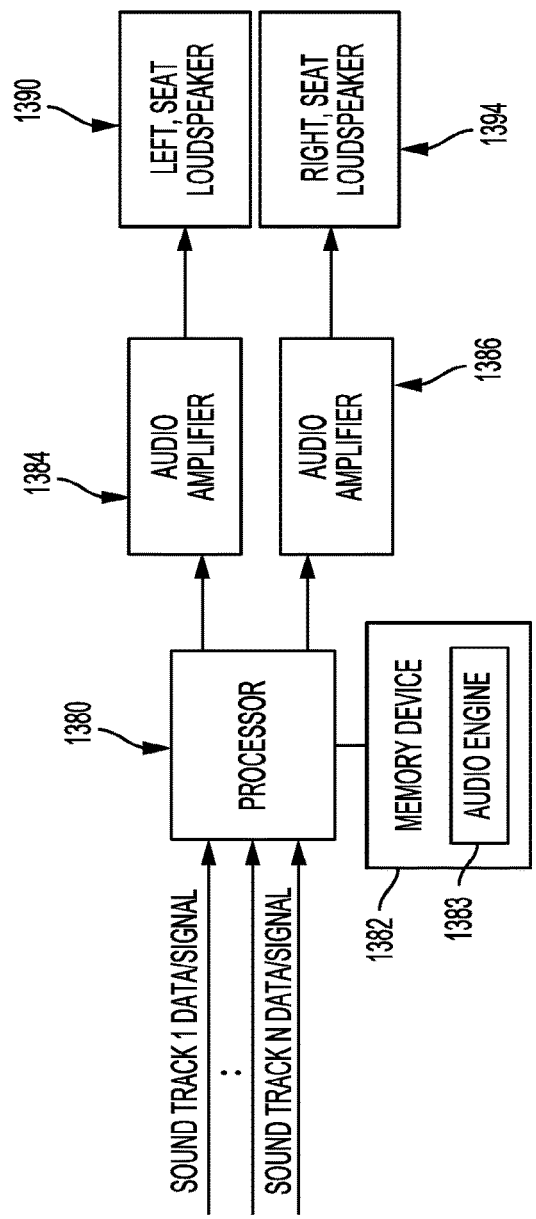

US 11,376,518 B2

CINEMA LIGHT EMITTING SCREEN AND SOUND SYSTEM

CROSS REFERENCE TO RELATED APPLICATION

This is a continuation of U.S. application Ser. No. 16/339,184 (allowed), filed Apr. 3, 2019 and titled "CINEMA LIGHT EMITTING SCREEN AND SOUND SYSTEM," which is a National Stage Entry of PCT Application PCT/IB2017/056186, filed Oct. 6, 2017 and titled "CINEMA LIGHT EMITTING SCREEN AND SOUND SYSTEM," which claims the benefit of priority of U.S. Provisional Patent Application Ser. No. 62/404,925, filed Oct. 6, 2016 and titled "Cinema Light Emitting Screen and Sound System," the entirety of each of which is incorporated herein by reference.

TECHNICAL FIELD

The present disclosure relates to sound systems and display systems in a theatre.

BACKGROUND

Cinema screens have a large area and are installed along with sound systems to output sound associated with image content displayed on the screen such that sound comes from the screen as if coming directly from the correct location relative to the specific position in the image content. In traditional screens, sound can originate from loudspeakers positioned behind the screen and the screen has a thin sheet of material with perforation to allow the sound from the loudspeakers to pass through the screen. Sound can also be directed to the audience from loudspeakers positioned behind or beside the viewing seating area for an audience. The screen, with its perforations, allows a portion of the sound to pass through. Sound-absorbing surfaces behind the screen can absorb the sound that passes through and prevents unwanted sound reflections. A theatre is carefully configured to optimize the sound environment to integrate with the visual environment, creating an immersive environment for cinema patrons to enjoy sound and image.

As presentation displays that emit light increase in popularity, with their greater potential for larger intensity dynamic range, increased brightness, increased viewing area, costs to manufacture are decreasing. These displays are being considered by some as the future for cinema theatres.

There are a number of differences that influence setting up a cinema screen as a light emitting display in place of a screen on which the image is projected onto the screen surface. A light emitting display is typically one large surface containing a matrix of light emitters. These large surfaces can be made up of numerous smaller panels or tiles positioned next to each other so that, cumulatively, they form a large viewing area. These panels are not transparent to sound waves passing through because of the continuous surfaces of these panels and the design of the supporting electronics, cooling, and mounting/support structures. When a screen intended for front projection of images is replaced by a light emitting display, the loudspeakers positioned behind the screen are no longer effective at delivering sound past the light emitting display and are repositioned at the perimeter of the light emitting screen to output sound to the viewer. For smaller light emitting displays, such as home TV-type displays, loudspeakers positioned at the perimeter of the display are acceptable. However, for a larger sized screen in a cinema, loudspeakers positioned around a perimeter that is many times greater than the width of the ear separation of a viewer is not an effective solution and the point of the sound is not well associated with the action on the screen.

SUMMARY

In an example, a cinema screen is positionable in a theatre. The cinema screen comprises a matrix of light emitters and a diffuser sheet. The matrix of light emitters is configured to form a light-emitting area of the cinema screen. The diffuser sheet includes one or more perforations, and is positionable between the matrix of light emitters and an audience area in the theatre. The diffuser sheet is positioned with respect to the matrix of light emitters such that the one or more perforations are configured to prevent light outputted by the light emitters from being viewable in the audience area.

In another example, a cinema screen is positionable in a theatre. The cinema screen includes a matrix of light emitters and a diffuser sheet. The matrix of light emitters is configured to form a light-emitting area of the cinema screen. The diffuser sheet is positionable between the matrix of light emitters and an audience area in the theatre. The diffuser sheet includes one or more gap areas between areas of the diffuser sheet that are positionable for receiving light from the light emitters. The one or more gap areas are configured for being absent of light from the light emitters.

In another example, a method includes forming, by a matrix of light emitters of a cinema screen in a theatre, a light-emitting area of the cinema screen. The matrix also includes diffusing, by a diffuser sheet positioned between the matrix of light emitters and an audience area in the theatre, a first part of light emitted from the matrix of light emitters toward the audience area. The method also includes preventing, by one or more perforations of the diffuser sheet, a second part of the light emitted from the matrix of light emitters from being viewable in the audience area.

BRIEF DESCRIPTION OF THE DRAWINGS

FIG. 12 is a functional block diagram of a system for processing sound data for loudspeakers in a theatre according to one example of the present disclosure.

FIG. 13 is a functional block diagram of a system for processing sound data for loudspeakers in a theatre according to another example of the present disclosure.

DETAILED DESCRIPTION

Certain aspects and features relate to light emitting displays and sound systems for use in cinemas for cinema presentations. Various examples are provided to configure a light emitting display for a cinema immersive environment that integrates a sound system to achieve the same or better immersive conditions in cinema theatres with front projection cinema screens. The screen can be active with light emitters, rather than being passive and solely reflecting light projected from a projector. Certain examples provide a light emitting system with a sound system that can overcome issues otherwise present with respect to using a light emitting system for a theatre experience. The terms "display" and "screen" are used interchangeably throughout the description.

In some examples, spaces are formed between adjacent light emitters in the display to allow for sound waves to pass from sound wave emitters, such as loudspeakers, positioned behind the screen to a viewing seating area in a cinema in front of the screen. Loudspeakers can be positioned in the spaces or behind the screen. Diffusers or other structures may be positioned proximate to a front of the screen to facilitate visual performance. In addition or in the alternative, loudspeakers can be positioned in each seat of the viewing seating area that produce sound waves that appear to be coming from a non-seating location in the theatre. These and other examples can enhance sound performance in a theatre that includes a light emitting display.

Cinema environments for light emitting displays can be different from viewing environments most viewers have come to experience with light emitting displays used at home, or for advertisement displays used indoors and outdoors. Light emitting displays, such as those currently available for home entertainment systems and video walls, have light emitters spaced closely together so viewers who stand closer to the display do not notice individual pixels of image or space between image pixels. Light emitting displays for advertisement used outdoors or at large venue events in daylight have extremely bright image pixels that use a significant amount of energy to power the larger displays and produce much heat. Such displays used indoors can produce a significant amount of heat that would need to be removed from a confined space of a cinema auditorium; hence, these displays may not be considered a good fit for cinema use. Furthermore, a light emitting screen can prevent sound waves from passing through such that application to theatre use is challenging.

Certain aspects and features of the present disclosure can address one or more of these or other issues and allow light emitting display configurations to be integrated with sound systems in ways that are mutually beneficial.

Figure 1:
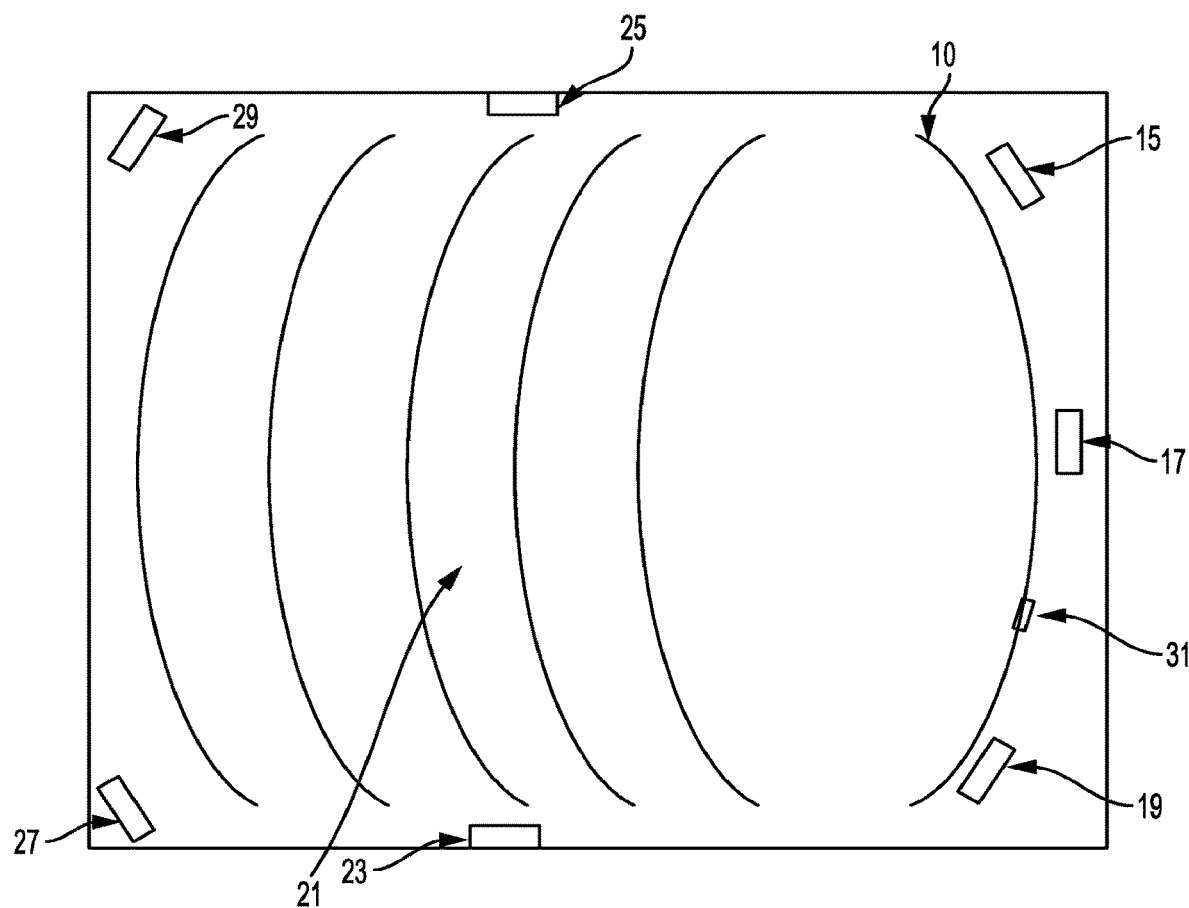
FIG. 1 is a schematic diagram of a theatre environment with a light emitting screen and a sound system according to one example of the present disclosure.

A cinema screen in a theatre with viewing seats and a sound system with multiple loudspeakers is shown in FIG. 1. The screen 50 is a light emitting screen. One loudspeaker arrangement shown in FIG. 1 has loudspeakers 15, 17, 19 positioned behind the screen 10 so that the screen is between the front loudspeakers and the viewing seat area 21 with rows of seats. Additional loudspeakers 23, 25 can be positioned along the side walls of the theatre and aimed to provide sound for viewers in the viewing seats. Loudspeakers 27, 29 can also be positioned along the wall at an opposite end of the viewing seat area 21 from which the light emitting screen 10 is positioned. The light emitting screen 10 can be constructed differently than traditional light emitting displays such that sound from the loudspeakers 15, 17, 19 passes through the screen 10 to a viewer when the light emitting screen 10 is positioned between loudspeakers 15, 17, 19 and a screen viewing position in the viewing seat area 21.

In some examples, the brightness of the light provided by the light emitting screen 10 can be changed in response to changes in ambient light levels in a theatre. For example, the audience may be wearing white or light colored clothing that reflect image light from the light emitting screen 10 and that can cause the ambient light in the room to increase. Or, one or more audience members may use a device, such as a cellular phone, that produces light and contributes to the ambient light in the theatre. In other examples, the level of ambient light can decrease during the visual presentation. A sensor 31 can be positioned in the theatre to detect a change in ambient light in the theatre. In some aspects, the sensor 31 is embedded within the light emitting screen 10. For example, the sensor 31 may filter light from the light emitting screen 10 or be positioned to avoid receiving much, if any, light from the light emitting screen 10, to detect the level of ambient light. In response, a controller or another device communicatively coupled to the light emitting screen 10 can cause the light emitting screen 10 to output light for the visual presentation at a different level of brightness that accounts for the changes in ambient light in the theatre.

If the average brightness is different between different visual presentations, the sensor 31 can capture the difference and communicate the difference to allow a show brightness to be changed to compensate for increased ambient light. For example, viewers in an auditorium during the summer months may have light colored attire whereas an empty theatre with a few viewers can have dark colored seats exposed to absorb more light in the theatre. The displayed content can have a light level, in view of an ambient light level, that is high enough such that a viewer with a lit up cell phone display is less disturbing to an adjacent viewer. While this light sensor 31 may be located in any space in or near the viewing area, there can be advantages to locating at least one light sensor 31 at the screen 10 or in the screen gap areas. The light sensor 31 at the screen 10 may detect the amount of light reflected back to the screen 10. This light sensor can respond to both the intensity of the pixels surrounding it by light rays that are misdirected from the light source to the gap area, but also the light returning to the screen 10 from the ambient environment. This combination of information can be used to achieve the best drive intensity for the entire display or subsections of the display. For example, if a particular portion of a screen is "washed out" by light from a door, compensation can be achieved to boost contrast levels of the image.

Figure 2:
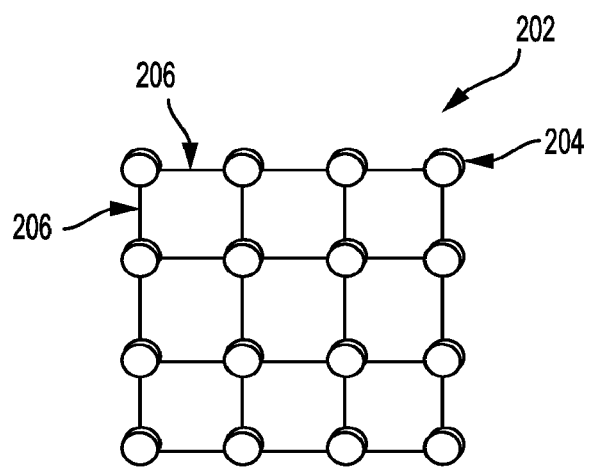
FIG. 2 is a schematic diagram of part of a light emitting display including an array or matrix of light emitting elements according to one example of the present disclosure.

FIG. 2 depicts a segment of a light emitting display in which an array of tiles form the light emitting display, according to one example. The light emitting tile can include a matrix 202 of individual light emitting elements as light emitters 204, such as LEDs, OLEDs, micro LEDs, or pixel fiber optics, with gaps (also referred to as spaces) between the individual light emitters 204. The gaps can be openings between the individual light emitters. A "light emitter" in general is a device or element that transmits light, rather than a device or system that solely reflects light. The individual light emitters 204 can be electrically connected with addressable conductive lines 206 routed between the individual light emitters 204 that have a physical dimension that takes up a small portion of the space available between the individual light emitters 204. The gaps may be relatively large and when viewed from a sufficient distance from the display surface (such as in a theatre environment), the gaps between the individual light emitters 204 may not be easily perceived by the viewer. In a cinema theatre, a front seat can be positioned a prescribed distance from the screen, such as a quarter or half a screen width back from the screen surface. For example, a screen width in a cinema can range from 40 feet to 100 feet or more in which the front seat position can be positioned 14 feet to 45 feet from the screen light emitting surface respectively.

Angular resolution below a threshold of perceiving a discrete image pixel on the screen can be achieved for larger spacing between image pixels on a display when the viewer is positioned further back from the display. The spacing between the light emitters 204 can be sized such that the angular resolution from a viewing position is below a predetermined threshold of angular resolution. For example, one acceptable criterion for a digital projection system projecting a 2k image (i.e., 2k pixels wide) onto a forty-foot screen can be image pixels that have a width of 0.24 inches and the image pixels are viewed from a distance of 10 feet to 15 feet or more from the screen. The resulting angular resolution from an acceptable condition of viewing image pixels of a specified width from a specified distance can serve as an angular threshold reference. The further away the closest seat is to the display in a cinema, the less perceptible larger gaps can be between the light emitters 204.

The gaps between the individual light emitters 204 can allow sound to pass between the light emitters 204 from loudspeakers positioned behind the matrix 202 of light emitters 204. To be effective at allowing sound to pass through the matrix 202 of individual light emitters 204, the gaps between the individual light emitters 204 can be an area that is relatively large with respect to the depth of the openings in the matrix 202.

Figure 3:
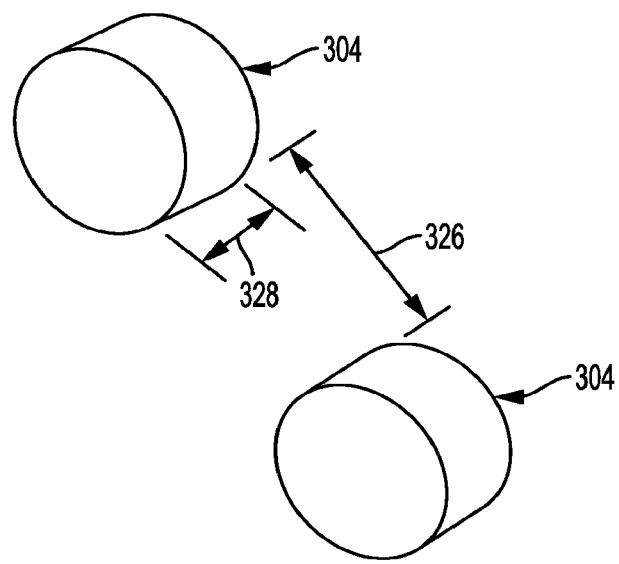
FIG. 3 is a schematic diagram of light emitting elements with spaces or gabs therebetween according to one example of the present disclosure.

FIG. 3 shows a space 326 between two light emitters 304 and a depth 328 of the light emitters 304 according to one example. The light emitters 304 can be used, for example, in the light emitting display of FIG. 2. In addition to the depth 328, the depth considered for sound system configurations can include the depth of the support structure (e.g., a printed circuit board) on which the individual light emitters 304 are mounted. Perforated screens for front projection can have a perforation dimension of 0.030 to 0.040 inches and a screen thickness in the range of 0.015 to 0.03 inches. Openings in light emitting screens can have a diameter that is equal to or greater than the depth of the opening. For example, a circular body with a diameter that is equal to or greater than a depth dimension of the area of the opening can be fit between light emitters 304. The depth of the emitter panel can have a dimension that is considerably greater than the thickness of a vinyl screen used in front projection screen; therefore, the space between the individual light emitters 304 can be sized such that the space with a depth does not cause undesirable resonances to occur for sound waves. For example, if the depth of the space between individual emitters is 0.1 to 0.25 inches, then the gap between the individual light emitters 304 can be of similar dimension or greater to avoid creating undesirable conditions for sound passing through the light emitting matrix on the tile.

Figure 4:
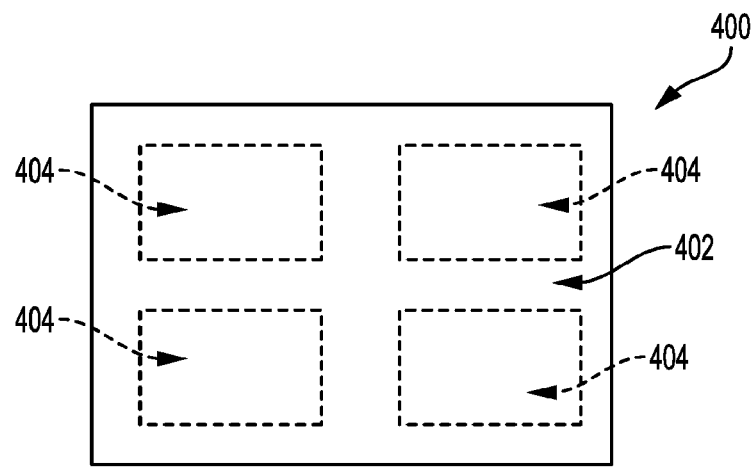
FIG. 4 is a front view of a panel for a light emitting display with gaps or spaces between light emitters according to one example of the present disclosure.

A light emitting screen panel with gaps between individual light emitters in at least a portion of the panel can allow sound to pass through the screen. For example, FIG. 4 outlines a light emitter panel 400 that has portions 404 in which there are gaps between light emitters. The gaps can be space in which sound is able to pass through the matrix of light emitters. A portion of the light emitter matrix on the tile 402 has light emitters with the same spacing as the light emitters in the portions 404; however, the gaps in the light emitter matrix 402 may not be the same, or may even be absent, to provide better an area for physical support of the tile on the display or screen structure.

By placing the light emitting panels 400 next to each other for an increased display area, the spacing between the individual light emitters can be the same between the light emitter panels as the spacing between the individual light emitters within the light emitting panel matrix.

Light emitter displays that have increased spacing between individual light emitters, as described above, can make alignment easier between panels to keep the spacing between light emitters constant over the full area of the screen. Smaller screen sizes can have smaller gaps, making alignment of panels more difficult to maintain a constant light emitter gap spacing across the whole screen.

In an alternate approach to configuring the matrix of light emitter on a tile, the spacing between light emitters can be random or pseudo random within the light emitter tile. The random spacing between light emitters within a tile can be consistent with random spacing between light emitters between adjacent tiles.

Figure 5:
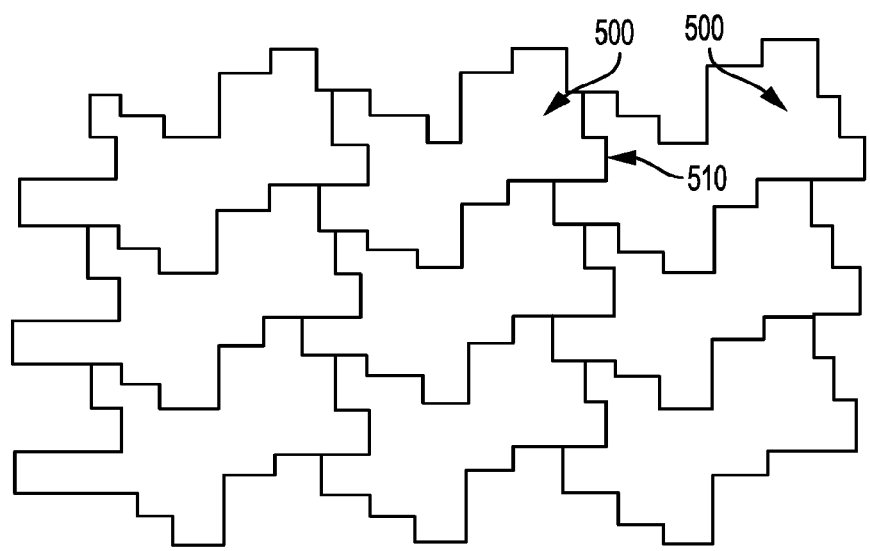
FIG. 5 is a front view of panels for a light emitting display with random edge contours according to one example of the present disclosure.
Figure 6:
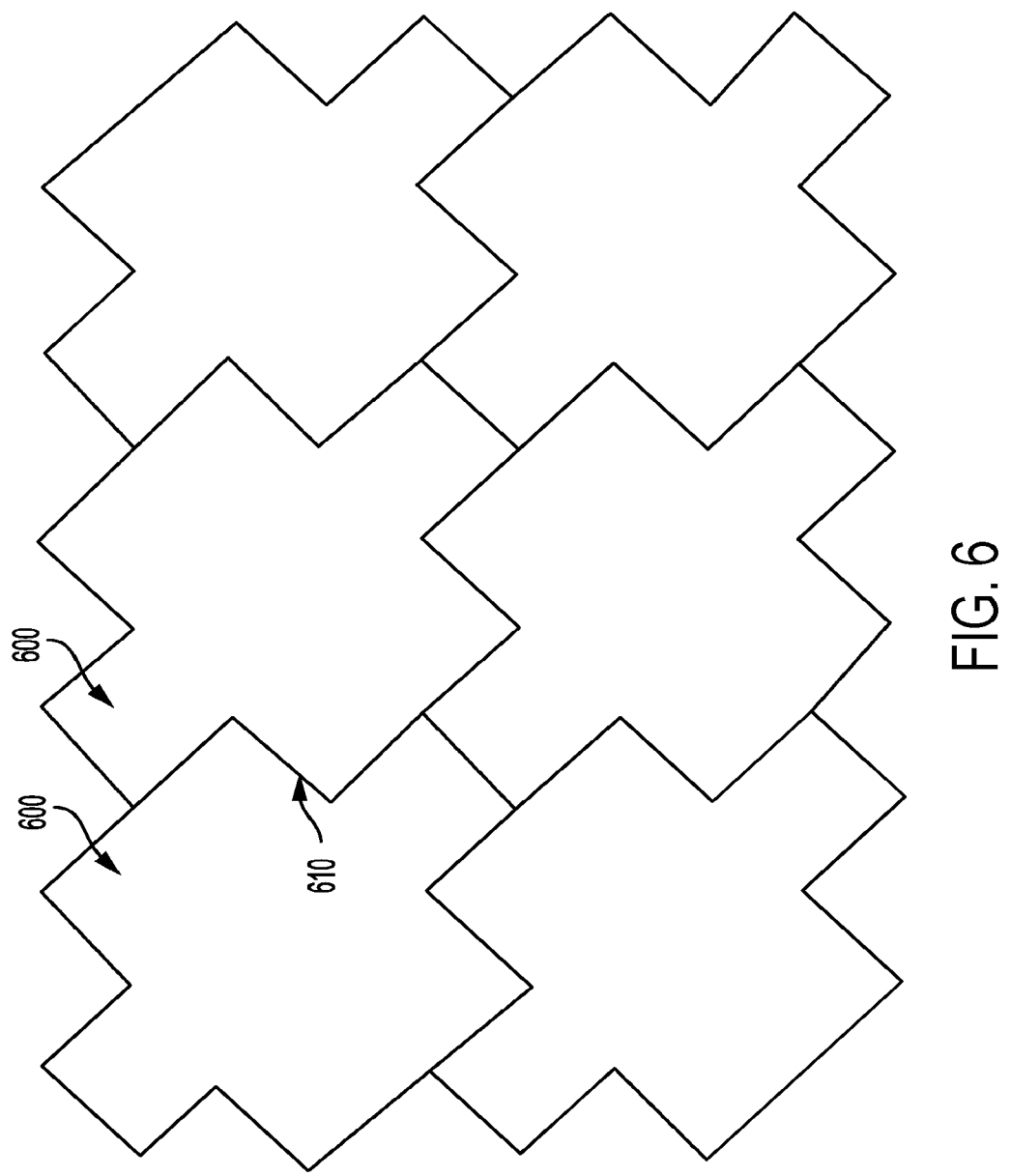
FIG. 6 is a front view of panels for a light emitting display that have saw tooth edges according to one example of the present disclosure.

In some examples, the tile or panel edges can be contoured to be perceived as being random or pseudo random to eliminate any noticeable visual differences between tiles where edges meet. In FIG. 5, two panels 500 have edge contours 510 that are more random. The panels 500 can be rotated 45 degrees such that the panels are diagonally positioned, which can make the contours more difficult to be perceived by a viewer. FIG. 6 shows two panels 600 that have an interlocking saw tooth edge 610. Although the edge contour is not random, the edge 610 can be significantly discontinuous that it can be less perceptible.

The increased gap space between individual light emitters can reduce the overall brightness of the display in the cinema theatre. But, unlike displays for home use with high ambient light viewing conditions, the cinema theatre can have very low levels of ambient light. In this situation, a viewer's eye can adjust to lower lighting conditions with a dilated pupil such that the amount of light required to stimulate daylight image scenes in a theatre can be much less than the amount of light needed for a display in a high ambient light situation.

The brightness of the light emitter can vary such that in night scenes (e.g., the media content being displayed includes scenes in dark or low light), the light emitter brightness can be increased to increase spatial contrast. For example, a night scene in which image pixels of a star or the moon in a night sky can be made to have a pixel brightness that is the maximum brightness of the pixel light emitter, thereby maximizing spatial image contrast. During a daylight scene where the majority of the image pixels are bright, the emitters may not be driven at full brightness but instead can be driven at a reduced brightness such that the viewer's eyes are not overwhelmed at a daylight scene as if emerging from a dark room to daylight.

Any of the matrix structures between the individual light emitters can be made black in color to absorb incident light originating from other sources, such as reflected light from the audience to the display or from cross lighting from other portions of the display, in particular if the display is a curved display. Black material that is a liner that can absorb light and is transparent to sound, such a scrim or similar cloth like material, can be placed behind the matrix to absorb light directed at the screen yet still allow sound to pass.

The matrix of light emitters can also be positioned behind a black mask material with a hole in front of each light emitter to allow light from the light emitter to pass through the mask to a viewer. The mask can be a liner that absorbs incident light and is transparent to sound. The liner can be made from any suitable material, examples of which include scrim or a black cloth material or other porous material. The mask can also manage or deterministically modify the sound to improve observer characteristics.

In some examples, a light diffusing sheet or membrane is positioned in front of the light emitter panel, between the light emitter and a viewer. Light emitted from an individual light emitter in the matrix can be directed at a portion of the diffuser sheet such that the spot of light on the diffuser sheet surface from the light emitter is larger than the area of the light emitter. The light emitters output light such that the divergence of light radiating from the light emitter covers an area on the diffuser sheet sufficient to reduce the appearance of gaps between the individual light emitters, as perceived by a viewer viewing the light emitting display with the frontal diffuser sheet.

Figure 7:
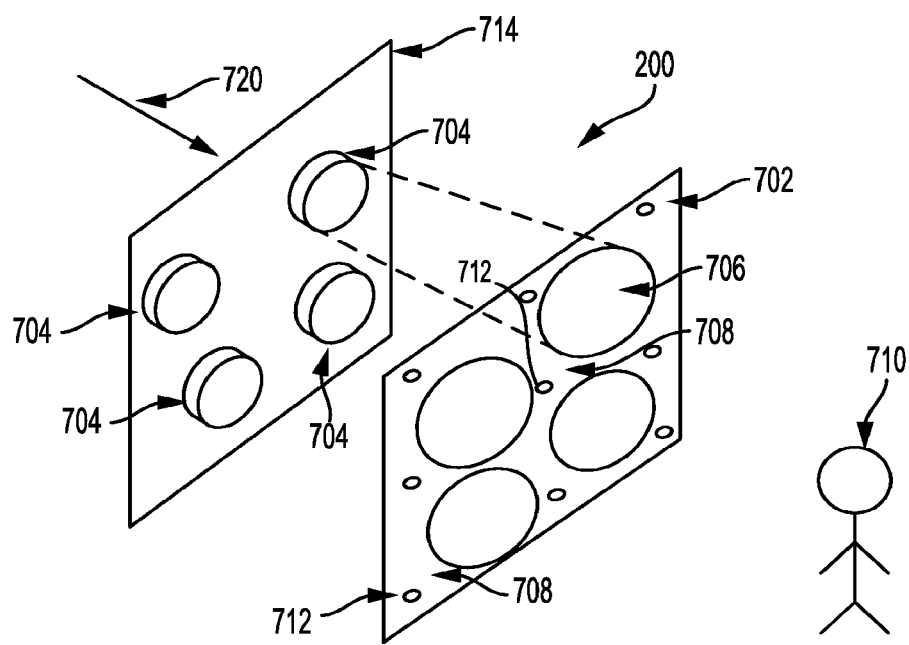
FIG. 7 is a perspective view of part of a light emitting display with a matrix of light emitters and an optically diffusing element according to one example of the present disclosure.

FIG. 7 shows a portion of a light emitting panel 700 with a matrix of four individual light emitters 704 positioned behind a light diffuser 702 that is a sheet. The light emitter 704 can output light to diverge from an optical axis of the light emitter 704 such that a light spot 706 is created on the diffuser 702. The viewer 710 can see a larger image pixel of light on the diffuser 702 than the physical size of the pixel of light at the light emitter 704. The diffuser 702 can reduce the size of the gaps 708 between the individual light emitters 704. The light emitter 704 can include a dome lens to cause the light to diverge to the desired area on the diffuser 702.

A light absorbing material 714 can be located behind the light emitters 704 to absorb stray light that is reflected back towards the light emitters 704 by the light diffuser 702, while allowing sound waves representing audio signals to pass through. The light absorbing material 714 can be black scrim or black cloth that is transparent to sound waves.

Figure 8:
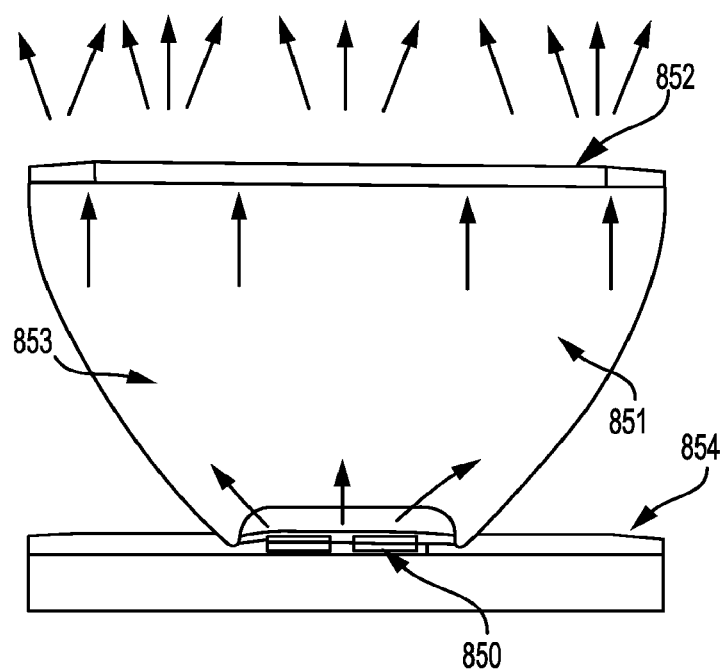
FIG. 8 is a side view of a light emitting element for use with a light emitting display that has an optical reflector according to one example of the present disclosure.

An alternate light emitter configuration is shown in FIG. 8. The light emitter configuration has an optical element, such as an optical reflector 851, to direct light from a light emitter 850 to an optical diffusing surface, such as diffuser 852, with a defined space and light scattering profile. The diffuser 852 can be mounted to the reflector 851 or the diffuser 852 can be a sheet that covers a matrix of reflectors. The light emitter 850 can represent one light emitter or more than one light emitter. For example, the light emitter 850 can be three light emitters, one for each primary color such as red, green, and blue. A black mask 854 can be placed in the area between or behind the light emitters 850 to absorb light incident on the display, and the black mask can be transparent to sound.

The reflector 851, without the diffuser 852, can direct light towards a viewing area. A light emitting screen or display can include reflectors that direct light in a predefined way to the viewer seats such that the screen has a gain that is the same as, or similar to, a gain of a high-gain cinema screen often used in cinemas for front projection. A light emitting display that has light emitters with reflectors can also have the reflectors positioned or aimed differently with respect to each other over the screen area to provide a custom spatial light distribution or light gain profile over the viewing seats and can reduce the light hot spot that is typical of high gain screens used in front projection cinema screens. For example, the light reflectors can be positioned and aimed to provide a more even spatial light distribution over the seating area by all the light emitters.

Instead of an engineered optical diffuser specifically positioned on each reflector, an optical diffuser sheet or liner can be in front of the reflector or the light emitting matrix with the light emitting elements but without the reflector portion. The diffuser sheet can become a barrier to sound passing through the gaps between the individual light emitters. Perforations in an optically diffusing surface, such as the diffuser sheet, however, can be arranged such that the perforations are placed in the gaps between the lighted areas or lighted spots formed on the diffuser sheet. Returning to FIG. 7, a perforation 712 is shown positioned in the portion with gaps 708 on the diffuser 702 that is a sheet between the lighted areas or light spots 706 to allow sound waves from the direction 720 to pass through the display from behind. The diffuser 702 can be as thin as, or thinner than, the screen material used for front projection systems to minimize the depth of the perforation dimension. The thickness of the diffuser 702 can be as low as 100 micrometers, provided that no objectionable visual artifacts are observable by lack of rigidity due to thickness. Alignment of the perforation 712 with the gaps on the diffuser 702 can avoid undiffused light originating directly from a light emitter from reaching the viewer's eye. Waveguides or a barrier to direct light from the light emitter to the area of the diffuser can prevent emitted light from passing through the openings to allow sound through.

An additional or alternate approach to a display that allows sound to pass therethrough for optimizing the integration of a sound system with light emitting display system by having a sound system that is local to the viewer. For large displays, such as displays sized 60 feet or more horizontally or 30 feet or more vertically, sound that originates at the display perimeter may no longer provide a quality audible presentation. By having a sound system be more local to a viewer (e.g., in the seat of viewer) in the theatre with the large display system, the audio portion can be presented to the viewer without being disadvantaged by the larger screen size. This configuration may not involve sound waves passing through the light emitter display as described above and can avoid having the potential of a visual artifact of light passing through the perforations of the diffuser sheet to a viewer.

Figure 9:
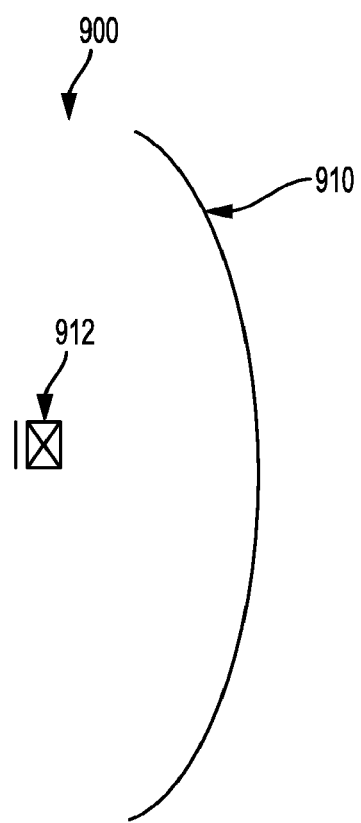
FIG. 9 is a schematic of a light emitting display that prevents or substantially prevents sound waves from passing through the display according to one example of the present disclosure.
Figure 10:
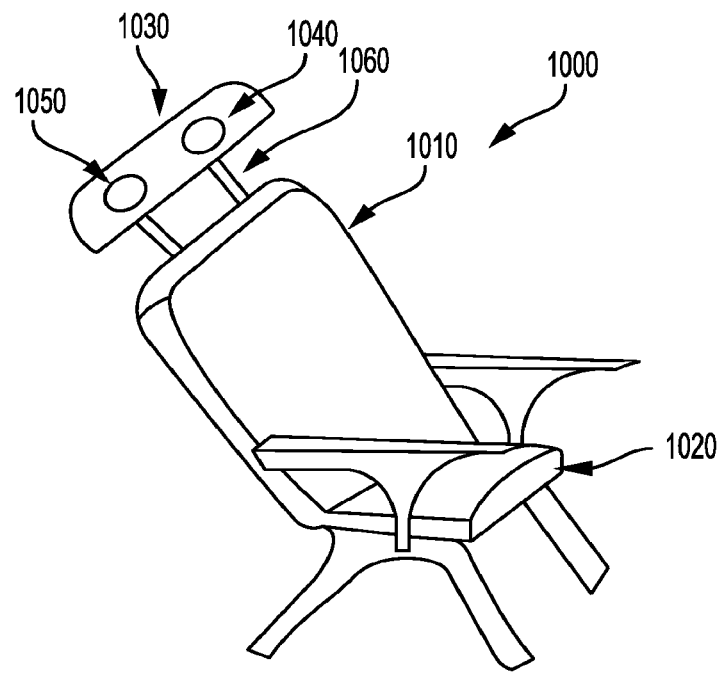
FIG. 10 is a perspective view of a seat for a theatre that includes a loudspeaker system according to one example of the present disclosure.

A theatre configuration shown in FIG. 9 has an image presentation display 910 that may prevent (or substantially prevent) sound waves from passing through the display 910 from behind the display 910 to a viewer positioned in a seat 912 in front of the display 910. The image presentation display 910 can be a light emitting display. The seat 912 can include a sound system. An example of a seat 1000 usable for such an environment is shown in FIG. 10. A viewer can sit on a seat platform 1020 such that the viewer's head is placed in the vicinity of the headrest 1030, or another type of top portion of a back support, with a right-positioned loudspeaker 1050 in a right area and a left-positioned loudspeaker 1040 in a left area. The headrest 1030 can be mounted on the top portion of the back support 1010 or the seat platform 1020. Each loudspeaker mounted in the headrest 1030 can spread sound with a specific spatial distribution. For example, the loudspeaker's spatial distribution can be narrow such that the sound is directed towards the space in which a viewer's ear is located or the sound distribution can result in the sound being directed at an ear of an adult positioned in the seat platform 1020 or at an ear position of a child seated in seat platform 1020.

Figure 11:
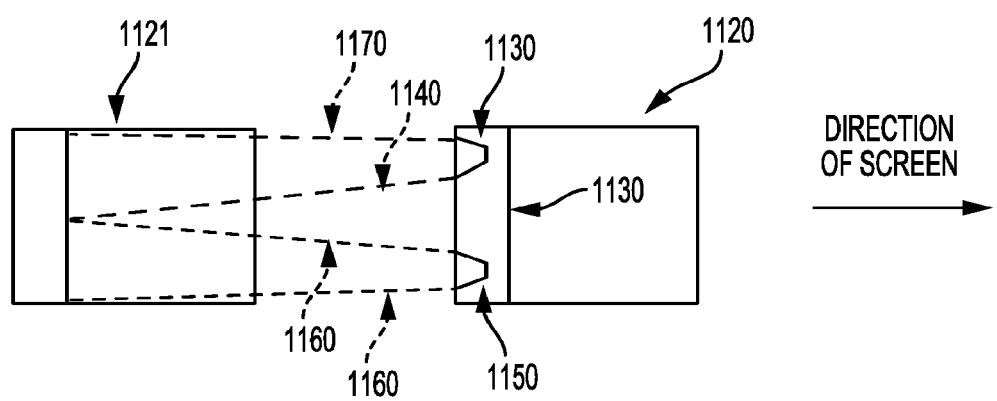
FIG. 11 is a top view of a seat for a theatre with includes a loudspeaker system according to another example of the present disclosure.

An alternate configuration of loudspeakers positioned in the headrest of a viewer's seat is shown as a top view in FIG. 11 where the left loudspeaker 1140 and the right loudspeaker 1150 in headrest 1130 for a seat 1120 are directed with their axis of sound towards the seat position of the seat platform 1121 behind the seat 1120. The spatial sound distribution 1170, shown as dashed lines, from the left loudspeaker 1140 is directed to the position of a viewer's left ear positioned in the seat platform 1121. Likewise, the spatial sound distribution 1160, shown as dashed lines, from the right loudspeaker 1150 is directed to the position of a viewer's right ear positioned in seat platform 1121. The spatial distribution of sound from the left loudspeaker and the right loudspeaker can cover the range of positions of a left ear and right ear, regardless of whether an adult or a child is seated in the viewing seat.

Cinema theatres can receive sound tracks intended for standard-type theatre sound system configurations. In a cinema with loudspeakers positioned among the theatre seats, such as those shown in FIG. 10 or FIG. 11, a sound processor or controller can control the signals going to each loudspeaker. A sound processor using appropriate algorithms can alter sound data from the sound tracks. The altered sound signals can be provided to the seat headrest loudspeakers for output such that the acoustical characteristics mimic sound as if loudspeakers are positioned behind the screen or in other non-seating areas of the theatre. The listener can perceive sound as originating from the locations that loudspeakers would have occupied.

One example of the algorithm for the sound processor can involve combining audio content on five channels of sound tracks intended for a sound system with several loudspeaker locations in an auditorium for binaural presentation-into two channels for a sound system that has two loudspeakers: one loudspeaker directed to a listener's left ear and the second loudspeaker directed to the listener's right ear. The audio content originating from the original multiple channels can be processed by determining and using transfer functions that represent the audio response of a listener's left and right ear in a sound system where the listener receives sound from the ideal locations of the loudspeakers that would have been located in the auditorium. The transfer functions can be a set of individual transfer functions in which one transfer function represents the audio response at the listener's left ear location or the listener's right ear location for audio content presented by one of the loudspeakers. In one example, transfer functions can be derived from a binaural recording or measurement made at the listener's position, or a model or calculation simulating the geometry of listener and reproducing transducers, for an audio signal presented at each of the auditorium loudspeaker locations. Combining the transfer functions of each of the auditorium loudspeaker positions with respect to a listener's left-ear position and combining the transfer functions for each of the auditorium loudspeaker positions with respect to the listener's right-ear position can allow sound data intended for multiple sound channels to be modified and used for two sound channels in a two loudspeaker position system, such as a two-loudspeaker system in a seat, for which sound can be directed from a left loudspeaker toward a listener's left ear and sound can be directed from a right loudspeaker toward a listener's right ear.

An enhancement of the seat loudspeaker configuration can be that signal processing for the seat loudspeakers or groups of seat loudspeakers is independent of image content shown on the screen and can be performed to suit the geometry of the seat location with respect to the screen position. The sound tracks intended for the loudspeakers positioned in the seating area can be modified for each seat loudspeaker set or groups of seat loudspeakers—a left loudspeaker and a right loudspeaker can be a set—to compensate for a specific seat position relative to the screen position to create an audio perspective among theatre seats consistent with respect to their position relative to the screen.

Loudspeakers can be positioned in the headrest such that the headrest can be replaced for servicing purposes. An audio signal can drive the headrest loudspeaker through an electrical connection in the headrest mount 1060 in FIG. 10. In other examples, the audio signal can be received wirelessly by the loudspeaker and the loudspeaker can be powered electrically via a wired connection through the headrest mount or via a wireless power transfer. The loudspeaker can also be powered by a battery in the headrest. Listeners can experience the standard cinema audio file through the headrest loudspeakers alone. Certain audio file sound tracks, such as sound tracks intended for sub base frequencies, can also be directed to separate loudspeakers in the auditorium.

A functional block diagram in FIG. 12 shows an example of a system of processing sound data intended for loudspeakers in the auditorium. A processor 1210 can execute instructions, such as an audio engine 1214, stored in a memory device 1212 to modify sound data received and directs the modified sound data to be used in loudspeakers in the vicinity of the seats such as the head rest loudspeakers. In FIG. 12, the processor 1210 receives an audio file with multiple sound tracks. The processor 1210 can execute instructions to extract the sound data from the sound tracks intended for the loudspeakers in the auditorium. The extracted sound data can be modified by a predetermined algorithm to create the sound track data to be used in the loudspeakers positioned within the seating area. The predetermined algorithms can be based on Head-Related Transfer Function (HRTF) methods that allow complete sound fields to be realized where the points of origin of the sound channels are perceived to be in the intended locations. In the example shown in FIGS. 10 and 11 there are two sound tracks used: one for the left loudspeaker 1040, 1140 and one for the right loudspeaker 1050, 1150. The processor 1210 can output the modified audio signals to the audio amplifiers 1220, 1230 that in turn provides the signal to the left loudspeaker and the right loudspeaker such that sound waves from the left loudspeaker and the right loudspeaker at a seated position in the seat have an apparent source of a loudspeaker arrangement positioned outside of a seating area of the light emitting display. In some examples, the processor 1210 and memory device 1212 can together form a controller for controlling sound signals provided to the loudspeakers. In other examples, the controller also includes the audio amplifiers 1220, 1230. The memory device 1212 may be a non-transitory computer-readable medium that includes program instructions.

Alternatively, the processor can process the sound data or sound signal already extracted from the audio file as depicted by block 1380 in FIG. 13 that shows the first to the nth track of sound data received by the processor. Using the predetermined algorithm that has already been loaded up into the processor, the received sound data or sound signal can be modified to produce the sound data or sound signal intended for the loudspeakers positioned within the seating area. Block 1380 can include a processor device executing instructions stored as an audio engine 1383 in a memory device 1382 to output the created soundtrack data to the audio amplifiers 1384, 1386 that in turn provide the signal to the left loudspeaker and right loudspeaker.

A light emitting display (such as light emitting display 910 in FIG. 9) that prevents (or substantially prevents) sound waves from passing through the display can be optimized in other ways. For example, the display can be optimized to absorb incident light more effectively or to reflect sound in multiple directions more effectively.

A light emitting display without loudspeakers positioned behind the display can have a surface that reflects sound in multiple directions to reduce any audio reverberations. For example, a display can be curved so that the display surface is slightly convex with respect to the audience viewing position such that sound spreads outwards as opposed to a concave curvature surface that reflects sound to converge towards the audience. The convex curved light emitting display surface can be tilted vertically towards the audience (e.g., the top edge of the display can be tilted towards the seating area while the bottom edge of the screen remains at the same position) so as to direct more light from the display light emitters to the audience and reflect any sound from the audience area away from the audience in multiple directions when reflecting off the display surface. An alternate approach may include the display surface having multiple reflective surfaces in segments (such as having a quadratic surface) that causes the sound to reflect in a set of directions. The light emitting display can also have a membrane between the light emitters and a viewer. The membrane can absorb at least some sound or allow sound to pass through to be absorbed by a substrate or structure behind the membrane.

Figure 20:
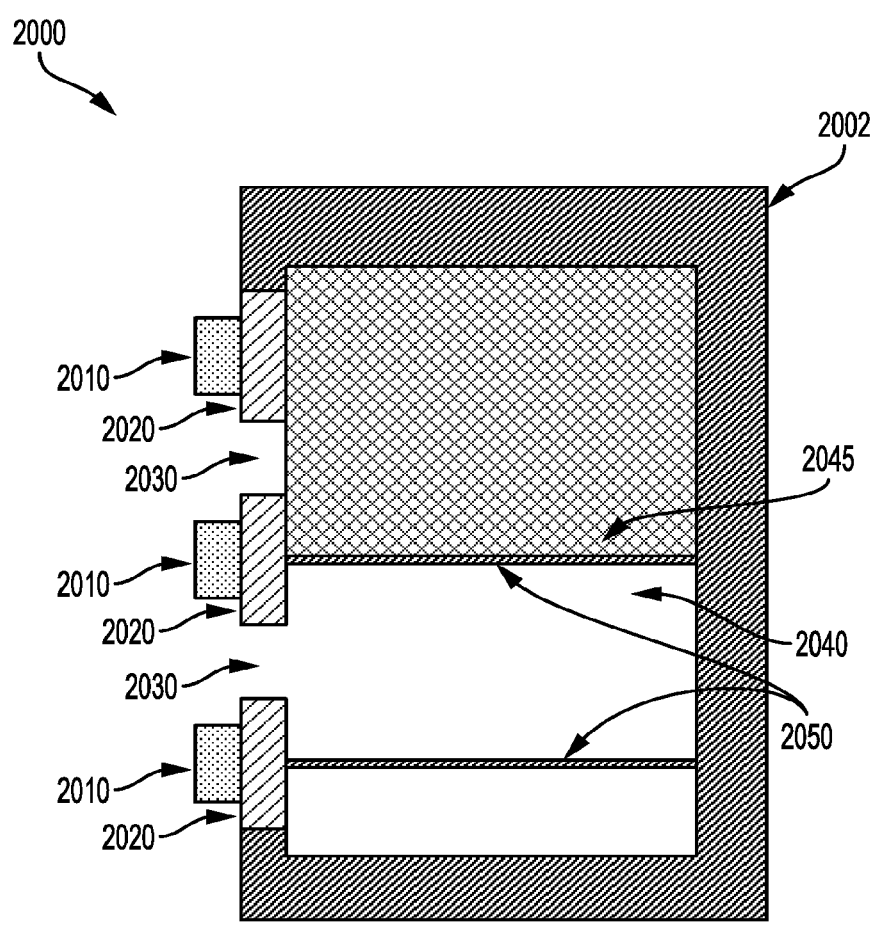
FIG. 20 is a cross-sectional side view of a light emitting display with sound absorbing features according to one example of the present disclosure.

In some examples, sound waves from a viewing seating position can be absorbed by a light emitting display to improve the auditory experience of sound waves associated with the visual presentation. FIG. 20 depicts a cross section of a portion of a light emitting display 2000 retained in an enclosure 2002 with light emitters 2010 positioned on a substrate 2020 according to one example. Openings or holes 2030 can be included through the substrate 2020 between the light emitters 2010. The space 2040 behind the holes 2030 can include acoustical absorbing material 2045 or the space behind the holes can be a tuned cavity using a partition 2050. The cavities can be tuned to a narrow or broad band of wavelengths of sound waves that resonate at different wavelengths of sound waves, or the display can have a distribution of different absorbing features, so that a broader range of wavelengths of sound waves over the area of the display can be absorbed or otherwise controlled.

Light and sound waves incident onto the display surface can be absorbed by the acoustical absorbing material 2045 in the enclosure space 2040 or the cavities. The substrate 2020 between the light emitters 2010 can be black in color to absorb light and the holes 2030 between the light emitters 2010 can allow sound waves coming from the viewer position to be absorbed. For example, the acoustical absorbing material 2045 positioned within the enclosure 2002 or panel can absorb or substantially absorb sound waves from the viewer's side that passes through the holes 2030. A variety of acoustical absorbing materials can be used. Examples include an acoustically porous material, such as a fiber material (e.g., fiberglass and wood fibers) or open cell foams specifically configured for sound absorption, and a membrane material, such as a physically dense film. Additionally or alternately, the holes 2030 can lead to a volume of space on the back side of the substrate 2020 such that the holes 2030 and chamber behind the holes 2030 form a resonance absorbing structure, such as a tuned cavity to absorb sound waves (e.g., similar to a Helmholtz acoustical absorber). The space behind the substrate 2020 can be substantial in that physically larger acoustic absorbing elements can be used.

Figure 14:
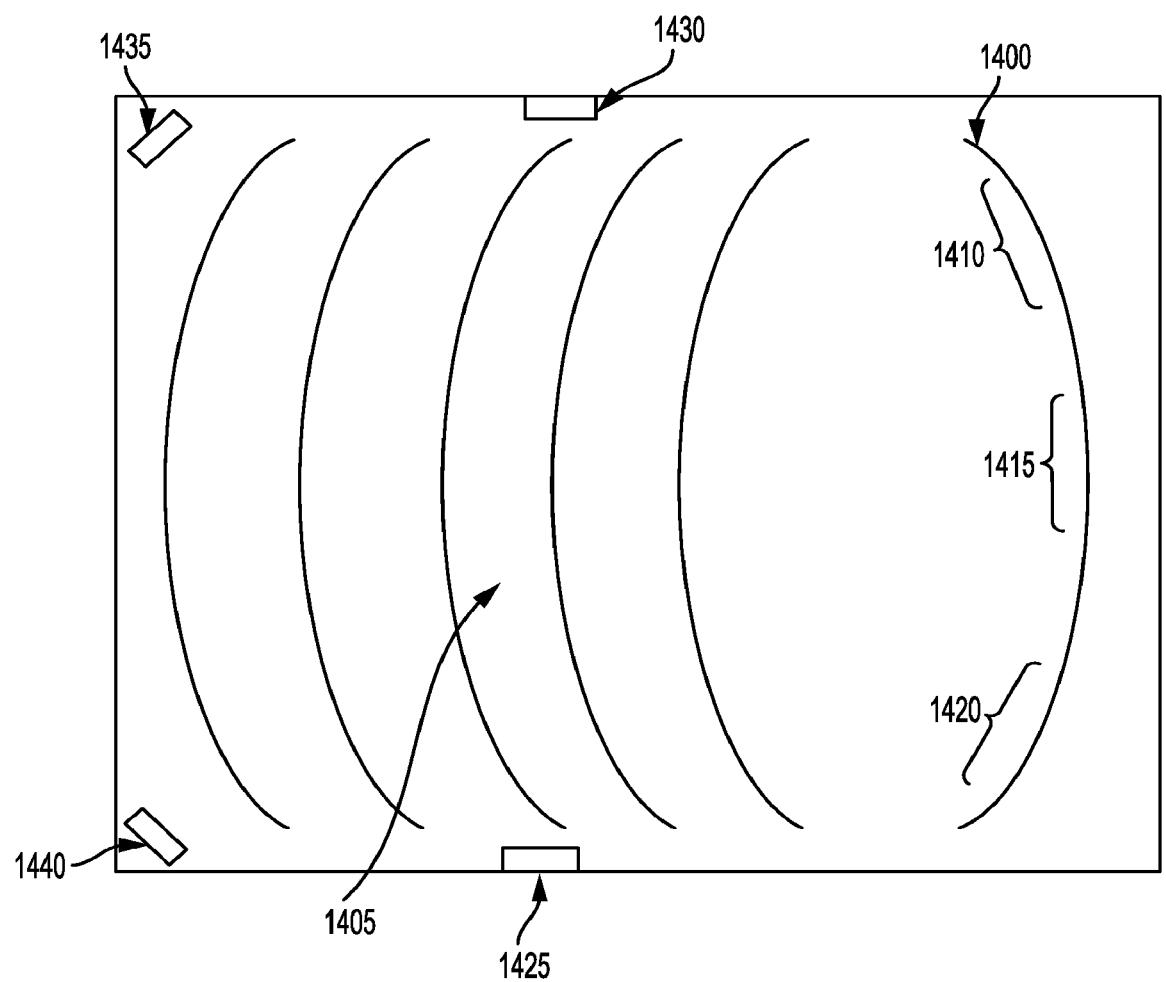
FIG. 14 is a schematic view of a theatre with a light emitting display and a sound system according to one example of the present disclosure.

Another approach to optimizing the integration of a sound system with light in a cinema emitting display system is shown in FIG. 14 in which sound may not pass through the light emitter display, but the sound can be produced at the display surface in place of sound being directed at the display from behind when positioning the loudspeakers behind and in close proximity of the display. A cinema theatre can include a light emitting screen 1400 in which portions of the light emitting screen have sound emitters placed in between the light emitters. For example, the portion 1410 of the screen 1400 can be the location at which a matrix of sound emitters at the display surface can be grouped to produce sound for a loudspeaker that would have been positioned behind the screen such as the front left loudspeaker 15 shown in FIG. 1. The portion 1415 of the screen can be the location at which a matrix of sound emitters at the display surface can be grouped to produce sound for a loudspeaker that would have been positioned behind the screen such as the front center loudspeaker 17 shown in FIG. 1. The portion 1420 of the screen can be the location at which a matrix of sound emitters at the display surface can be grouped to produce sound for a loudspeaker that would have been positioned behind the screen such as the front right loudspeaker 19 shown in FIG. 1. The screen 1400 can be constructed to emit sound and light that are directed toward the viewing seat area 1405. The loudspeakers 1425, 1430 can be loudspeakers that are similar as the loudspeakers 23 and 25, respectively, in FIG. 1. Loudspeakers 1440, 1435 positioned at the back of the viewing seat area 1405 can be similar to the loudspeakers 27, 29, respectively, as shown in FIG. 1.

Figure 15:
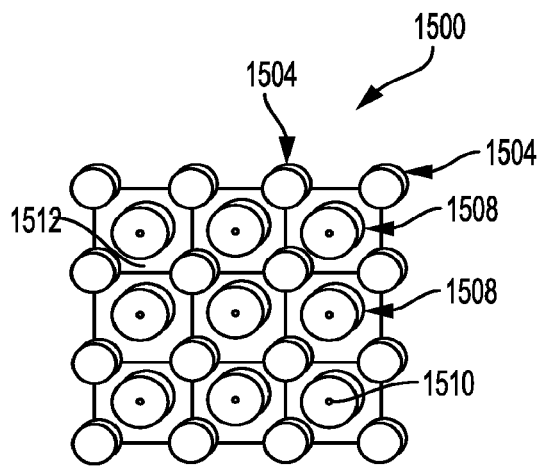
FIG. 15 is a schematic view of light emitters with sound emitters positioned in spaces or gaps between the light emitters according to one example of the present disclosure.

Screen 1400 can have a light emitter matrix, as shown in FIG. 15, that has light emitters 1504 that can be electrically interconnected, as shown in FIG. 2. Sound emitters 1508 can be placed in the space between the light emitters 1504. The light emitters and the sound emitters can also be mounted on the same side of a common mounting substrate such as a printed circuit board. A screen can be formed with a number of display panels and a display panel can include a number of light emitters and a number of sound emitters as shown in FIG. 15 such that the display panel can provide an image and sound for an audio visual presentation. During display panel fabrication, the light emitters and the sound emitters can be populated using the same or similar pick and place production process on a printed circuit board or panel board or panel infrastructure since the components to be placed are larger than light emitters on LCD and LED monitors used on desktop computers. The assembly process for a display panel can be performed by placing light emitters and sound emitters on large area substrates configured to mount semiconductor and other discrete devices. Sound emitters can be small electromagnetic, electrostatic, or piezoelectric transducers for emitting sound. The sound transducer can be a voice coil actuated type or other type of diaphragm actuated system.

Figure 16:
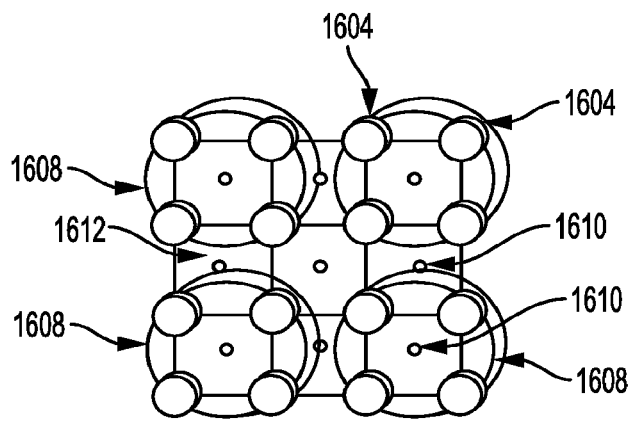
FIG. 16 is a schematic view of light emitters with sound emitters positioned in spaces or gaps between the light emitters according to another example of the present disclosure.
Figure 17:
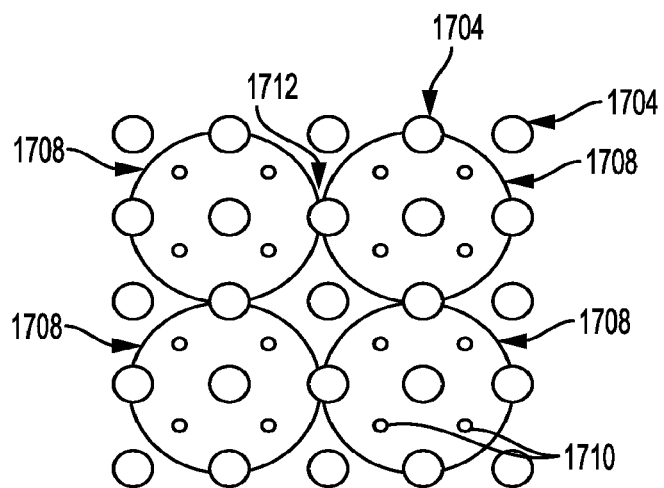
FIG. 17 is a schematic view of light emitters with sound emitters positioned in spaces or gaps between the light emitters according to a further example of the present disclosure.

If the gaps between the light emitters are large enough, the sound emitter can fit in the space between the light emitters as shown in FIG. 15. If the sound emitter is of a larger size, it can be placed in a second matrix of sound emitters that can be attached on or positioned with respect to a first matrix of light emitters from behind. Alternatively, the light emitters can be attached to one side of a printed circuit board and the sound emitters can be attached to the other side. Port holes or gaps in the printed circuit board between the light emitters can be made to allow the sound from the sound emitters mounted on the backside of the printed circuit board to pass through the board to the front side of the printed circuit board where the light emitters are mounted. FIGS. 16 and 17 show alternative ways a matrix of sound emitters can be positioned with respect to a matrix of light emitters when the sound emitters are positioned behind the light emitters with respect to a viewer of the light emitting display. The light emitters can be positioned with respect to the sound emitters and the gaps between the light emitters to minimize the influence that the light emitters can have in interfering with sound in the sound path of the sound emitters and in influencing the spatial sound distribution and the frequency response of the sound emitters. FIG. 16 shows the sound emitters 1608 symmetrically placed with respect to the light emitters 1604 such that the lighter emitters may only influence the radiated sound at the peripheral portion of the sound emanating from the sound emitter. FIG. 17 shows a larger sound emitter 1708 that can be placed symmetrically with respect to the light emitters 1704 at the periphery and one light emitter positioned at the center of the sound emitter. The display panel can include a light emitter matrix and a sound emitter matrix such that the panel is one device. The spacing between the light emitters can be random and spacing between the sound emitters can be random but the light emitters and sound emitters can be spatially aligned with each other.

Figure 18:
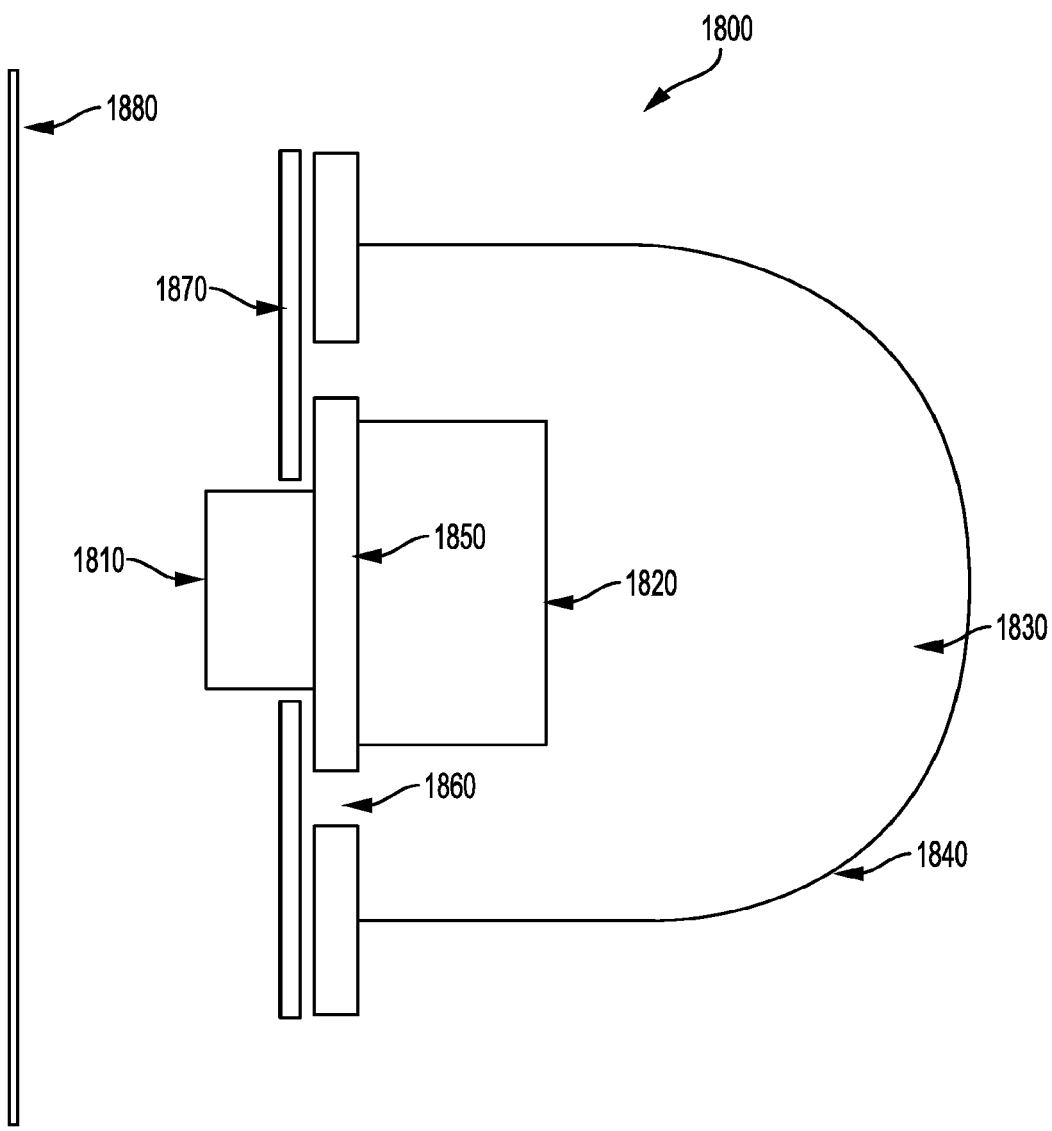
FIG. 18 is a schematic side view of a light emitting element and a substrate according to one example of the present disclosure.

FIG. 18 shows another configuration 1800 in which the sound emitter 1820 is mounted on the backside of a printed circuit board substrate 1850 and the light emitter 1810 is mounted on the front side of the substrate 1850. The sound emitter 1820 has an enclosure 1840 that can be an acoustic cavity so that sound from the sound emitter 1820 is directed through the holes 1860 in the substrate 1850. In front of the substrate 1850 with the light emitter 1810 is a light diffuser layer 1880 and on the front surface of the substrate 1850 that is not a hole or a light emitter is a black masking material such as a black mask 1870 or a mask that can be silkscreened onto the substrate 1850.

The matrix of sound emitters can output sound waves such that the cumulative sound pressure level of the sound emitters in the matrix of sound emitters is comparable to the sound pressure level produced by loudspeakers placed behind a screen in a cinema theatre with front projection.

The matrix of sound emitters can be positioned over the display such that the matrix of light emitters and the matrix of sound emitters cover the same area of the display. In other examples, the matrix of sound emitters can be limited to portions of the area covered by the matrix of light emitters. For example, the display with a matrix of light emitters can have three sections in which there are three matrices of sound emitters positioned in the display at a position where behind-the-screen loudspeakers would be placed for a front projection screen.

If a diffuser liner is placed over the light emitting matrix depicted in FIGS. 15-18, and as described with respect to FIG. 7, the diffuser can have perforations to allow the sound to pass through. When the sound emitters are part of the display panel, the position of the perforations can be between the spots of light on the diffuser from the light emitters and positioned over the sound emitters. For example, in FIG. 15, the perforations 1510 are positioned directly over the sound emitters 1508 and in the gaps between the light spots on the diffuser caused by the light emitters 1504. FIG. 15 depicts each perforation in a light gap positioned between light spots, such as light spots 706 shown in FIG. 7, having a sound emitter dispersion path positioned behind the perforation. The perforations can be dimensionally the same as perforations in cinema screens for front projection (e.g. 0.030 inches to 0.040 inches in diameter or larger diameters). This can be an efficient configuration for emitted sound waves to pass the diffuser to the audience. In FIG. 16, the perforations 1610 are in the gaps positioned between the light spots on the diffuser by light from the light emitters 1604. In some examples, 50% or less of the perforations can be positioned directly in front of a sound emitter. FIG. 17 shows another efficient coupling arrangement between the sound emitted by the sound emitters 1708 and the perforations 1710 in that the perforations are in front of sound emitter or in the audio spatial dispersion path of the sound emitters. The area around the light emitters and the sound emitters 1512, 1612, 1712 can be a black mask to absorb light reflected back by the diffuser sheet from the light emitters 1504, 1604, 1704.

Figure 19:
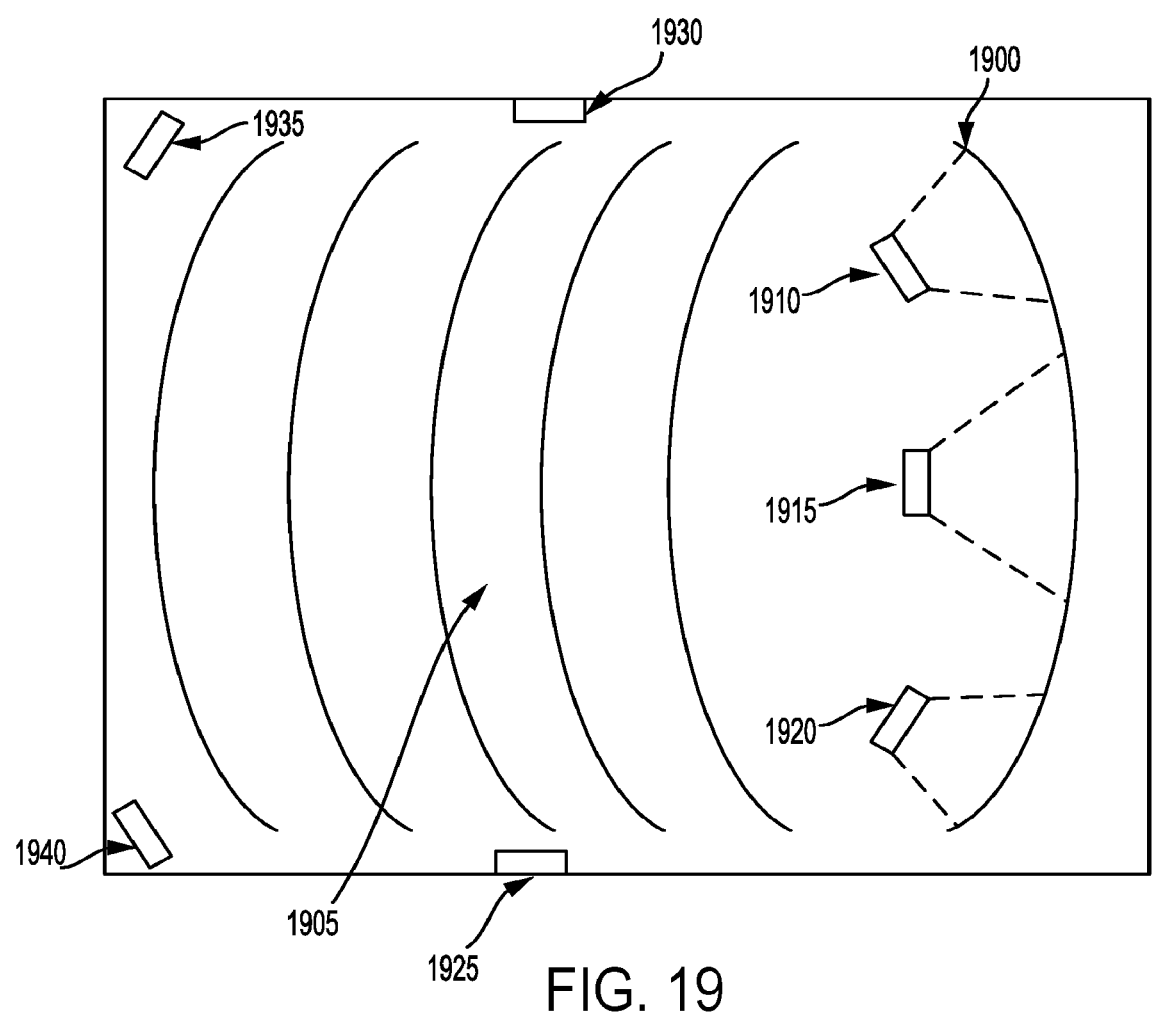
FIG. 19 is a schematic view of a theatre with a light emitting display and a sound system according to one example of the present disclosure.

Another theatre configuration with a light emitting display that has a surface configured to reflect sound is shown in FIG. 19. Loudspeakers 1910, 1915 and 1920 can be placed in front of the light emitting display 1900 and have their sound dispersion path directed to the surface of the light emitting display so the display surface is used to reflect the sound towards the seating area 1905. The side loudspeakers 1925 and 1930 as well as the rear loudspeakers 1940 and 1935 can be placed in the same manner as illustrated in FIGS. 1 and 14. The loudspeakers in front of the display can be positioned above the floor but outside of the viewer's site lines of the display.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

What is claimed is:

1. A cinema screen positionable in a theatre, the cinema screen comprising:
   a matrix of light emitters configured to form a light-emitting area of the cinema screen; and
   a diffuser sheet including one or more perforations and being positionable between the matrix of light emitters and an audience area in the theatre such that lighted spots are formed thereon from the matrix of light emitters and one or more gap areas are formed between the lighted spots, wherein the one or more perforations are alienable with respect to the one or more gap areas to prevent light outputted by the light emitters from being viewable through the one or more perforations in the audience area.

2. The cinema screen of claim 1, wherein the one or more gap areas are configured for being absent of light from the light emitters.

3. The cinema screen of claim 1, further comprising an optical element positioned between the diffuser sheet and at least one light emitter of the matrix of light emitters.

4. The cinema screen of claim 1, further comprising an emitter-support structure to which the matrix of light emitters is mounted such that the light emitters are spaced apart from each other to define an emitter gap between adjacent light emitters, at least one light emitter and the emitter-support structure together forming a depth dimension, wherein the cinema screen is positionable with respect to a loudspeaker that is configured to output sound waves toward the emitter-support structure, wherein the emitter gap and the one or more perforations are configured to allow the sound waves to pass through the cinema screen and toward the audience area.

5. The cinema screen of claim 4, wherein the emitter gap has a diameter that is equal to or greater than the depth dimension.

6. The cinema screen of claim 4, wherein the diffuser sheet has a thickness in a range of 0.015 inches to 0.03 inches.

7. The cinema screen of claim 1, further comprising an opaque mask positionable proximate to the light emitters of the matrix of light emitters, the opaque mask being configured to be transparent to sound.

8. The cinema screen of claim 1, further comprising a barrier configured to direct emitted light from the matrix of light emitters to the lighted spots and to prevent the emitted light from passing through the one or more perforations.

9. A cinema screen positionable in a theatre, the cinema screen comprising:
   a matrix of light emitters configured to form a light-emitting area of the cinema screen;
   a diffuser sheet being positionable between the matrix of light emitters and an audience area in the theatre, the diffuser sheet including lighted areas for receiving light from the light emitters and including one or more gap areas between the lighted areas, the diffuser sheet being configured to prevent light outputted by the light emitters from being viewable in the audience area through one or more perforations of the diffuser sheet aligned with the one or more gaps.

10. The cinema screen of claim 8, further comprising an optical element positioned between the diffuser sheet and at least one light emitter of the matrix of light emitters.

11. The cinema screen of claim 8, further comprising an emitter-support structure to which the matrix of light emitters is mounted such that the light emitters are spaced apart from each other to define an emitter gap between adjacent light emitters, at least one light emitter and the emitter-support structure together forming a depth dimension, wherein the cinema screen is positionable with respect to a loudspeaker that is configured to output sound waves toward the emitter-support structure, wherein the emitter gap and the diffuser sheet are configured to allow the sound waves to pass through the cinema screen and toward the audience area.

12. The cinema screen of claim 11, wherein the emitter gap has a diameter that is equal to or greater than the depth dimension.

13. The cinema screen of claim 11, wherein the diffuser sheet has a thickness in a range of 0.015 inches to 0.03 inches.

14. The cinema screen of claim 8, further comprising an opaque mask positionable proximate to the light emitters of the matrix of light emitters, the opaque mask being configured to be transparent to sound.

15. The cinema screen of claim 9, further comprising a barrier configured to direct light from the matrix of light emitters to the lighted areas and to prevent the light from passing through the one or more perforations.

16. A method comprising:
   forming, by a matrix of light emitters of a cinema screen in a theatre, a light-emitting area of the cinema screen;
   diffusing, by lighted areas of a diffuser sheet positioned between the matrix of light emitters and an audience area in the theatre, a first part of light emitted from the matrix of light emitters toward the audience area the diffuser sheet including one or more gap areas between the lighted areas and including one or more perforations aligned with the gap areas; and
   preventing, by the diffuser sheet with the one or more perforations aligned with the gap areas, a second part of the light emitted from the matrix of light emitters from being viewable in the audience area through the one or more perforations.

17. The method of claim 16, further comprising:
   receiving the first part of the light by the lighted areas of the diffuser sheet, the one or more gap areas being absent of light from the matrix of light emitters.

18. The method of claim 16, further comprising an emitter-support structure to which the matrix of light emitters is mounted such that the light emitters are spaced apart from each other to define an emitter gap between adjacent light emitters, at least one light emitter and the emitter-support structure together forming a depth dimension, wherein the cinema screen is positioned with respect to a loudspeaker that outputs sound waves toward the emitter-support structure, wherein the emitter gap and the one or more perforations allow the sound waves to pass through the cinema screen and toward the audience area.

19. The method of claim 18, wherein the emitter gap has a diameter that is equal to or greater than the depth dimension.

20. The method of claim 18, wherein the diffuser sheet has a thickness in a range of 0.015 inches to 0.03 inches.

21. The method of claim 16, further comprising an opaque mask positioned proximate to the light emitters of the matrix of light emitters, the opaque mask being transparent to sound.

* * * * *